March 3, 1931. G. R. ANDERSON 1,794,663
PROTECTING AND HEAT RADIATING MEANS FOR ELECTRIC MOTORS
Filed Jan. 31. 1929
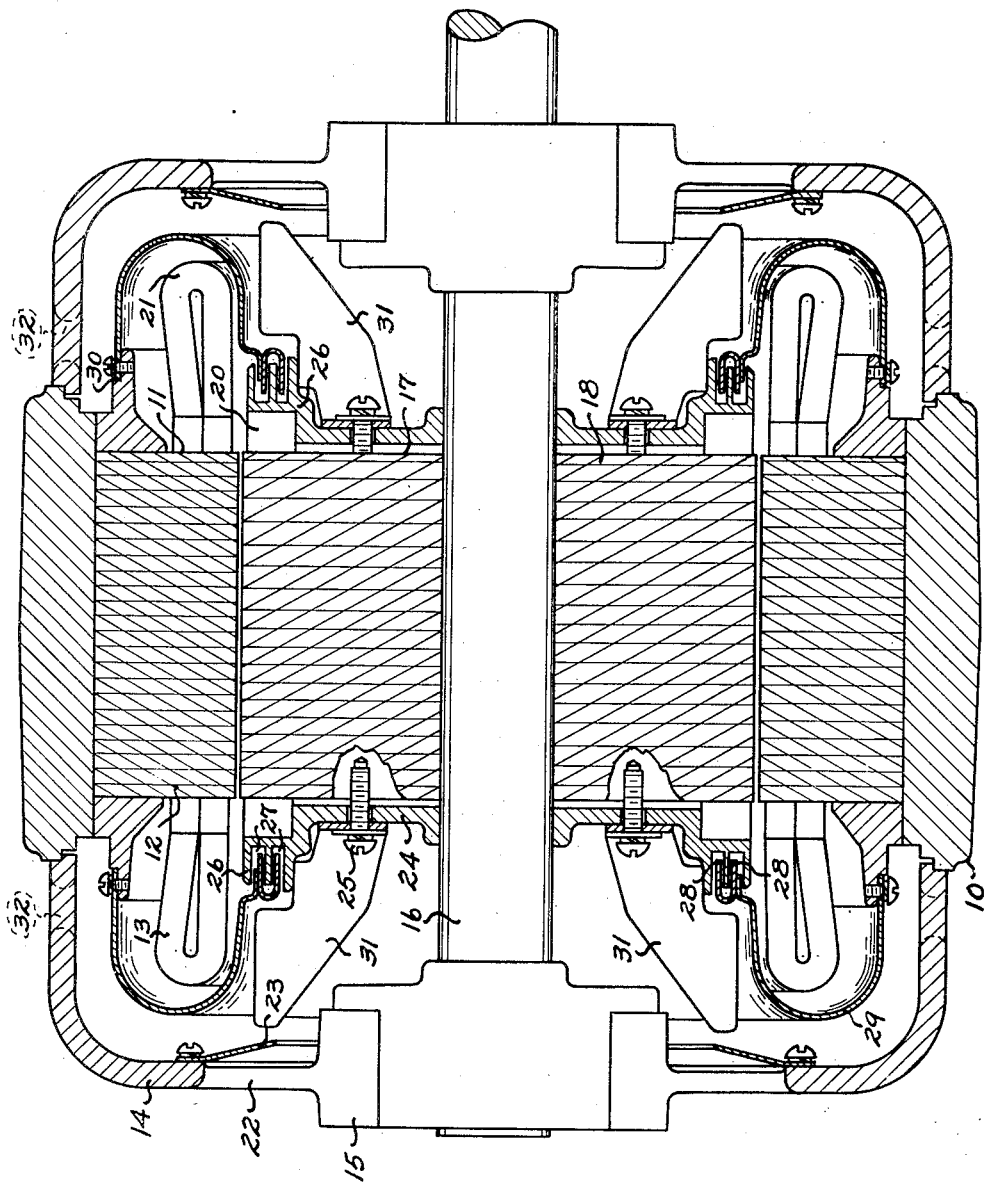
INVENTOR
GORDON R. ANDERSON
BY
ATTORNEY Patented Mar. 3, 1931

1,794,663

UNITED STATES PATENT OFFICE

GORDON R. ANDERSON, OF INDIANAPOLIS, INDIANA, ASSIGNOR TO FAIRBANKS, MORSE & CO., OF CHICAGO, ILLINOIS, A CORPORATION OF ILLINOIS

PROTECTING AND HEAT-RADIATING MEANS FOR ELECTRIC MOTORS

Application filed January 31, 1929. Serial No. 336,385.

This invention relates to improvements in protecting and heat radiating means for electric motors, and particularly to cooling and enclosing devices for electric machines.

An object of the present invention is to provide improved means for easily and readily converting an open type motor into a motor of enclosed type, without thereby impairing the rating and efficiency of the motor.

A further object is to provide an improved motor enclosing device, having a rotating portion in heat conducting association with the heating portions of the rotor, and adapted, with other portions of the device, completely to enclose, cool and protect all of the conducting portions of the machine.

A still further object is to provide an enclosing device of improved form and construction, which is neat and compact in arrangement, whereby to be employed as an accessory in existing types of machines, and which will provide for a maximum ease of assembly, and which is economical to construct and install.

Further objects and advantages of the present invention will appear from the following detailed description of a preferred embodiment thereof, and from the accompanying drawing, which shows a vertical sectional elevation of an electric motor provided with improvements according to the present invention.

The older, prevailing devices for cooling electric motors or the like by ventilation, usually employed for this purpose, fans or impellers of expensive and complicated construction, and in some cases required a plurality of air channels or ducts disposed either internally or externally of the motor frame. Such devices, although effective within limits, add materially to the cost of manufacture and conversion, and usually the parts of existing types of machine must be altered for the reception of these older devices. It is therefore a purpose of the present invention to provide an efficient cooling and protecting means which may be attached to an electric motor of the usual open types, either at the time of manufacture, or as an accessory to be attached by the user, with a minimum interruption of motor service.

The desirability of an enclosing and protecting device as an accessory for electric motors, has been appreciated by those skilled in the art, but attempted solutions of the problem have heretofore resulted in a plurality of parts, some or all of which are difficult and expensive to make, and which, in some cases, are formed to include angulate portions and recesses, which after a period of motor operation, serve to offer lodging places for dirt or other foreign matter, and result in a decrease in the efficiency and heat conductivity of the device.

It will, of course, be understood that the present detailed description and the accompanying drawing relate to a single preferred executional embodiment of the present invention, and that substantial changes may be made in the described construction and arrangement of the parts, without departing from the spirit and full scope of the invention, as defined by the appended claims.

Referring by numerals to the drawings, 10 designates, generally, an electric motor which may be of any desired, or conventional construction. The motor comprises a stator 11 and a core 12, in which is provided stator windings 13. The stator 11 comprises a part of, or is carried by and within the usual frame of the machine, the frame preferably including end members 14, provided with bearing arms 15, in which are fitted the motor bearings of the usual association with a shaft 16. The rotor 17 is secured to the shaft and comprises a laminated core portion 18 which is slotted to receive the rotor bars, (not shown), each of which is suitably secured in mechanical and electrical connection with the end rings 20. As particularly pertinent to certain of the present improvements to be described hereinafter, it will be noted that windings 13 have laterally extending coil portions 21, in accordance with the prevailing construction and practice.

The windings and live parts of the machine are cooled by introducing air through openings 22 formed in the end members 14. For the purpose of directing this entering air stream, I prefer to provide an annular air-deflecting disk or baffle element 23, which is detachably mounted on the end member 14 adjacent the openings 22, there being one of such elements at each end of the motor, serving to direct, inwardly, the air entering the openings, as will hereinafter appear.

As an enclosing means for the rotor, I prefer to provide a disk or plate 24 which rotates with the shaft 16, and which, by preference, has its inner portion spaced somewhat from the laminated portion of the rotor, thus providing between the disk and rotor, a space for circulating air. The plate or disk 24 is positioned relative to the rotor by means of screws, bolts or the equivalent, indicated at 25, and which may extend partly into or completely through the rotor element as may be desired. By great preference, the plate 24 is provided with an enlarged periphery forming a rim which is arranged contiguously to the end rings 20, and by which heat is readily absorbed from the end rings, for cooling purposes, and dissipated to the currents of air outside of the enclosed motor portions. The described periphery or rim, indicated at 26, is by preference provided with two or more annular slots 27 for the purpose of accommodating a furcated inner edge 28 of a shield or shroud 29, and forming therewith a reasonably close fit, thereby forming a running seal between these elements. By preference, the plate or disk 24 is constructed of cast metal which, however, may be of relatively thin construction for space economy and better heat conductivity.

It will be understood that the shield or shroud 29 is by preference formed of sheet metal of a relatively high heat conductivity. I have found that copper or aluminum or certain alloys thereof serve satisfactorily in forming this member. The shield and cooling member 29 is extended upwardly and outwardly from the slots 27 and from its furcated edge, and is thence turned inwardly upon itself to form a cupped portion which, in the present example, is of U shaped cross section, to the end of serving to enclose the laterally extending coil portions 21 of the stator windings. The shield 29 is supported from its outer edge 30 which overhangs and forms a rigid connection with a stationary portion of the rotor or frame. The cooling and protecting member 29 is of sufficient rigidity to retain its initial conformity, but it is nevertheless sufficiently flexible to enable the furcated edge 28, or the parts thereof, to be displaced as may be required to insure a reasonably close running fit with the adjacent parts of the slots 27. The provision of a running seal at this point between the plate 24 and shield 29, eliminates the possibility of the entrance of dirt or foreign matter to the live parts of the machine. In the preferred example, the shield is characterized by a somewhat convexly curved exterior surface, which is kept free of external deposits of dirt and the like by the air currents external thereto.

Each of the disks or plates 24 is by preference equipped with a plurality of combined fan blades and cooling portions 31. These may be constituted as separate elements, as shown, or, if preferred, may be formed integrally with the plate or disk. It will be seen that the elements 31 serve substantially to increase the area of heat radiation on the outside surface of each of the plates, and further have the function of fan blades. The operation of the described device is thought to be readily apparent from the above detailed description of its parts, but may for convenience be stated briefly as follows: During the operation of the motor, the described blade or fan elements serve to direct a current of cooling air radially outwardly and against the convex surface of the shield 29, air being supplied to the fan blades through the openings 22 in the end members, and thence directed into the fan blades by the annular baffles 23. The current of air is then directed outwardly by the fan blades against the exterior surface of the sheet metal shield 29, passes entirely around the U shaped portion of the shield and outwardly through openings 32 (shown in dotted lines) provided near the outer, central portions of the motor frame.

It may be seen from the preceding description that an electric motor provided with the described improvements is effectively divided, for purposes of air circulation, into separate air compartments or portions, namely, the space inside of the members 24 and 29, and the space external thereto; the air currents in each of such compartments being shielded completely against the air of the other compartment. The air of the inside compartment, within and about the windings and live parts of the machine, is agitated to a satisfactory degree by the effect of rotation of the rotor bars, which, as will be understood, are spaced relative to each other and which, because of the position of the plates 24, serve to some extent as a fan, and tend to create an air stream progressing radially upwardly or outwardly through the rotor portions, around the extended coil portions 21 of the stator windings, and against the inside surface of the sheet metal shroud 29, at which point heat is dissipated through the thin sheet metal of the shield, and into the air stream outside of the enclosing portions. This described forced circulation of air in both the internal and external compartments defined by the shields and plates 29 and 24, will serve effectively to cool all heating portions of the machine upon operation thereof through the ordinary ranges of speed.

In use, the device described has been found to be applicable to practically all existing types of motors, and motors so equipped are at least the full equivalent, so far as performance and characteristics are concerned, of the open type motor, with the added feature of protection of the live parts of the motor from dirt and foreign matter usually existing in the surrounding air.

I claim as my invention:

An electric motor, including a stator, windings associated with and projecting beyond the core or body of the stator, and a rotor; an annular shield of substantially U shaped cross-section, formed of sheet metal of relatively high heat conductivity, the outer edge of the shield being secured to the stator, and adapted substantially to embrace the extended portions of the stator winding, the inner edge of the shield being disposed substantially inwardly of the gap between said rotor and stator; a closure plate on the rotor shaft and arranged for rotation with the rotor and having a portion contiguous thereto, means forming annular slots in said closure plate, the inner edge of the shield being furcated, with the furcations disposed in said slots and forming a running seal therewith; a fan element carried by said plate, and a baffle, formed of sheet metal, detachably secured to a stationary end portion of the motor and adapted, with the fan element, to direct a current of air radially outwardly along the exterior surface of said shield.

GORDON R. ANDERSON.